United States Patent [19]

Ingram et al.

[11] Patent Number: 4,708,968
[45] Date of Patent: Nov. 24, 1987

[54] DIVINYLBENZENE IN EXPANDABLE BEADS FOR CUP MOLDING

[75] Inventors: Alvin R. Ingram, West Chester; Adolph V. Di Giulio, Wayne, both of Pa.

[73] Assignee: Atlantic Richfield Company, Los Angeles, Calif.

[21] Appl. No.: 64,354

[22] Filed: Jun. 22, 1987

Related U.S. Application Data

[63] Continuation of Ser. No. 859,976, May 5, 1986, Pat. No. 4,692,472.

[51] Int. Cl.4 ............................................. C08J 9/18
[52] U.S. Cl. ........................................ 521/60; 428/35; 521/56; 521/146
[58] Field of Search ............................ 521/56, 60, 146

[56] References Cited

U.S. PATENT DOCUMENTS 2,848,427  8/1958  Rubens .................................. 521/60
2,848,428  8/1958  Rubens .................................. 521/60

Primary Examiner—Morton Foelak
Attorney, Agent, or Firm—Lewis J. Young

[57] ABSTRACT

Copolymer beads made by suspension copolymerization of styrenic monomer with divinylbenzene under conditions such that the products had defined solubility, gel content, molecular weight and bead size characteristics which enabled their use (after impregnation with a blowing agent and pre-expansion) in molding into foamed cups over a much broader range of time and temperature and the resultant cups are stiffer per given weight than cups made from conventional polystyrenes utilized for making foamed cups. These advantages are realized without any sacrifice in cup appearance.

1 Claim, No Drawings

DIVINYLBENZENE IN EXPANDABLE BEADS FOR CUP MOLDING

This is a continuation of application Ser. No. 06/859,976 filed May 5, 1986, U.S. Pat. No. 4,692,472, 9-8-87.

BACKGOUND OF THE INVENTION

The field of this invention is foam cups molded from expandable styrenic polymer beads.

The foam cup industry is based on expandable polystyrene beads. The base polystyrene beads used for cups are characterized by a weight average molecular weight ($M_w$) of between 250,000 and 350,000 with a polydispersity ($M_w/M_n$) of from 2.0 to 3.0. Such conventional polystyrenes generally have melt flows (Condition L) in the 2.0 to 6.0 g/10 min. range. Past efforts to utilize higher molecular weight polystyrenes (350,000–500,000) with similar polydispersities have generally resulted in poor over-all performance in regard to expandability and to cup processing capabilities and cup appearance.

U.S. Pat. No. 2,848,428 teaches to prepare copolymers of styrene and 0.01–0.5% divinylbenzene to improve the heat resistance of polystyrene foams. These copolymers are impregnated by polymerization of the monomers in the presence of the desired blowing agents. The copolymers are completely gelled as evidenced by the requirement that the be "insoluble or substantially insoluble in toluene".

SUMMARY OF THE INVENTION

We have now found that improved cup stiffness, heat tolerance, resistance to leakage and visual gloss for a given density of cup relative to current commercial polystyrene cups can be obtained by utilizing copolymerized expandable poly(vinyl aromatic monomer) beads in which the comonomer is divinylbenzene. These copolymer beads are characterized by gel contents of 0 to 50% by weight and by toluene soluble protions having high molecular weights (280,000–750,000) and broad polydispersities ($M_w/M_n$ 3.0–7.0). The solubility of the vinyl aromatic monomer/divinylbenzen copolymers useful in this invention vary from completely to mostly soluble in toluene.

DETAILED DESCRIPTION OF THE INVENTION

The present invention provides for the production of expandable vinyl aromatic copolymers having sufficient divinylbenzene as comonomer with a vinyl aromatic monomer to give the specified properties.

The vinyl aromatic monomers useful in these copolymers may be styrene, alpha-methylstyrene, nuclear-methylstyrene, para-t-butylstyrene, mono-chlorostyrene, dichlorostyrene, or mixtures thereof. The most common and preferred vinyl aromatic monomer is styrene.

The divinylbenzene comonomer may be any of the three known isomers thereof or, preferably, may be any of the commercially available mixtures thereof.

The copolymers of the invention are prepared by copolymerization of the monomers in stable aqueous suspension. Suspension polymerization techniques are well known. For example, a preferred method employs a suspension system comprised of an inorganic suspending agent, such as tricalcium phosphate and a suitable modifier. Other preferred suspension systems employ organic suspension stabiliziers alone, such as polyvinyl alcohol, hydroxyethyl cellulose, polyvinyl pyrrolidone and the like. Equally useful suspension systems may employ combinations of inorganic and organic suspending agents, for example tricalcium phosphate and polyvinyl alcohol. An important advantage of the aqueous suspension systems is that the desired polymer particles may be obtained as beads of optimum size.

The process of the present invention may be used with monomer solution to water ratios in the suspension which vary from about 0.3 to 1.5 parts by weight monomer solution per 1.0 part by weight water. The monomer soluble free-radical initiating catalysts which are added to the suspension system are a mixture of at least two free-radical type materials comprising a primary low-temperature initiator having a 10-hour half-life temperature of between 60° and 80° C. and a secondary high-temperature initiator having a 10-hour half-life temperature of between 95° and 110° C. Thus, a mixture of benzoyl peroxide and t-butyl perbenzoate which have 10-hour half-life temperatures of 73° and 105° C., respectively, can be used. Certain azo-type initiators may also be used. Conveniently, conventional amounts of such initiators are used in the invention. Small amounts of water soluble suspension modifiers such as potassium persulfate may be added in some instances.

The time and temperature cycles for the polymerization may be those conventionally employed. Conveniently the cycle described in Grim. U.S. Pat. No. 2,673,194, or the two-stage temperature cycle described in D'Alelio, U.S. Pat. No. 2,692,260 is employed. With such a two-stage cycle, in the first stage an elevated temperature of about 50°–90° C. is used for a period of about 3–7 hours, and a second stage uses polymerization temperatures in a range of about 100°–150° C. for a period of about 0.25–5.0 hours.

The pre-screened copolymer beads are rendered expandable by impregnating the beads with between 3–12 percent of a volatile blowing agent such as a gas or an agent which will produce a gas on heating. Such blowing agents are preferably one or more compounds selected from the aliphatic hydrocarbons containing from 4 to 6 carbon atoms in the molecule, including butane, pentane, cyclopentane, hexane, cyclohexane, and the halogenated hydrocarbons which boil at a temperature below the softening point of the vinyl aromatic polymer. Such blowing agent, and processes for impregnating the vinyl aromatic polymer beads therewith, are well known, such as for example is described in U.S. Pat. No. 2,983,692. It is well known to those skilled in the art, that the blowing agent, or mixture of blowing agents, may be incorporated into the polymer particles during the aqueous suspension polymerization of monomer solutions.

The vinyl aromatic monomer-divinylbenzene copolymer beads containing a volatile blowing agent, (or mixture of blowing agents) generally in an amount of about 3–12 percent, are pre-expanded by exposing the beads to heat, such as by subjecting them to steam, hot air or hot water, for example by use of a pre-expander as described in U.S. Pat. No. 3,023,175, as is commercially done. The pre-expanded particles are then permitted to stand under atmospheric conditions for a period of time, such as two hours to two days prior to charging the pre-expanded, aged particles to a mold for the formation of foamed cups.

The useful copolymer beads are copolymers of vinyl aromatic monomer and divinylbenzene, said copolymer having a gel content of 0-50% by weight and a toluene soluble portion having a weight average molecular weight between 280,000 and 750,000, a polydispersity ($M_w/M_n$) of 3.0 to 7.0, and a bead size of through 30 and on 80 mesh, preferably through 35 and on 60 mesh, U.S. Standard Sieve The soluble DVB copolymers with $M_w$ up to 300,000 do not display significant strength improvements, whereas those that have gels content greater than 50% experience serious process (expandability) and cup molding problems. Cups molded from such highly gelled beads have poor foamability and poor fusion and hence such gelled beads are not moldable into acceptable cups.

With the essentially soluble DVB bead copolymers, the higher molecular weights, 400,000–750,000, contribute to the greater heat tolerance and improved stiffness of the resulting molded cups, while the greater polydispersities $M_w/M_n$ of 3.5 to 7.0, permits good expandability of the impregnated beads, and good cup processing with no sacrifice in cup appearance.

The DVB bead copolymers containing up to about 40 percent gels, are also characterized by very high molecular weight soluble components, with broad polydispersities and the cups derived therefrom have improved properties of heat tolerance and cup stiffness while retaining good expandability and cup processing characteristics. These result from both gel reinforcement and the molecular weight characteristics of the soluble components. At the higher gel contents, 40-50 percent, where the molecular weight of the soluble components are in the conventional range, the still broad polydispersities, $M_w/M_n$ 3.0–4.0 and gel reinforcement give major improvements in heat tolerance while permitting significant improvements in cup stiffness. The gloss of cups molded from these DVB copoymers, in particular those containing gels, were visually superior to that exhibited by polystyrene cups molded under similar conditions. Resistance to leakage are also superior to conventional polystyrene cups.

An important ramification of the DVB copolymer-bead properties, is that commercially functional cups may be molded at lower densities but with equivalent strength properties to those cups molded from commercial polystyrene beads and at molding cycles which are equivalent or faster. Conversely, the DVB copolymer beads at equivalent densities may be molded to advantage at higher machine steam pressures without adversely affecting cup functionality or appearance.

The small bead size (−30+80 mesh) is required because of the narrow passages in a cup mold.

It will be obvious to those skilled in the art that the desired characteristics of gel content, molecular weight, polydispersity and bead size may be obtained by the appropriate variation and combination of polymerization time and temperature, DVB concentration, initiator concentration and chain transfer agents. Thus, Table II below shows the effect of DVB concentration at one peroxide concentration and one set of polymerization conditions. Table III shows the effect of peroxide concentration at one DVB concentration and one set of polymerization conditions. Similar relationships can be developed for other variations and concentrations.

It will also be obvious to those skilled in the art that the present process may also be used for vinyl aromatic polymer particles that contain various other additives, such as flame retardant agents, dyes, pigments, antistatic agents, plasticizers, and the like, and polymeric additives, such as minor amounts (0.05–0.50 wt. %) of polyethylene, polypropylene and in particular poly waxes such as low molecular weight ($M_n$ 650–1500) narrow MWD, crystalline (densities, 0.93–0.96) polyethylenes, and similar molecular weight Fischer-Tropsch waxes. The invention is further illustrated by the following examples wherein parts and percentages are by weight unless otherwise indicated.

EXAMPLE I a. Preparation of Copolymer

To a series of 12 oz. crown-cap bottles there was charged 99 g. of water, 1.5 g. of tricalcium phosphate (TCP), 1.0 g. of 1% sodium dodecylbenzene sulfonate solution, and a styrene solution consisting of 100 g. of styrene, 0.04 g. of active divinylbenzene (DVB), 0.25 g. of benzoyl peroxide and 0.066 g. of tert-butylperbenzoate. The bottles were sealed and heated with end-overend agitation in an oil bath for a period of 6 hours at 90° C. and then cooled to room temperature. The bottles were opened and 1.0 g TCP and 1 g of 1% sodium dodecylbenzene sulfonate solution were added to each, then purged with $N_2$ and recapped and replaced in the oil bath and heated at 135° C. for 2 hours. The bottles were cooled to room temperature. The resultant beads were separated, washed with water and air dried. The dried beads were then subjected to screen analysis using U.S. Standard Sieves and those beads passing through 35 mesh and staying on 50 mesh were combined and used for further work. Characterization of these beads showed a weight average molecular weight of 660,000, a polydispersity ($M_w/M_n$) of 5.5 for the soluble component, and 13% gels as determined by toluene solubility. (See Ib) This compares to a polystyrene control made without DVB which had $M_w$ of 270,000, $M_w/M_n$ of 2.4, MI of 4.5 and no gels in toluene.

b. Characterization of Bead Products

The various bead products from this and following examples were separated into toluene soluble and toluene insoluble components and the soluble component was further characterized as to weight average molecular weight, $M_w$, and polydispersity, $M_w/M_n$.

Samples of beads, approximately 0.4–1.0 g., were accurately weighed, placed in stoppered flasks along with 200 g. of toluene. These were allowed to digest, with intermittent swirling, for periods of 3–7 days. The gels were filtered into crucibles onto Celite filter beds and percent gels quantitatively determined. The soluble component was recovered from the toluene filtrate by precipitation into methanol. The $M_w$ and $M_w/M_n$ were determined on a Waters Gel Permeation Chromatograph, Model 150C.

c. Impregnation of Copolymer Beads

To a series of 12 oz. crown-cap bottles there was charged 97 g. of water, 2.0 g. of TCP, 2.0 g. of 1% sodium dodecylbenzene sulfonate solution, 1.5 g. of 10% polyoxyethylene (20) sorbitan monolaurate solution, 7.8 g. n-pentane, and 100 g. of the polymer beads from (a) having bead size through 35 mesh and on 50 mesh, U.S. Standard Sieve. The bottles were capped and heated with end-overend agitation in an oil bath for 0.5 hours up to 105° C., maintained at 105° C. for 2 hours, and then cooled to room temperature over a 2 hour period. The bottles were opened and then acidified to pH 1.0 with hydrochloric acid. The beads were washed with water and tray dried. The beads were then treated with 300 ppm of silicone oil and 1000 ppm zinc stearate in a twin-shell blender for 30 minutes and then batch expanded in a 5 gallon laboratory bucket pre-expander.

d. Molding and testing of cups

The pre-expanded beads from (c) were then molded into cups on a cup machine made by Master Machine and Tool Company using an 8F mold under 70 psig steam header pressure and 32 psig back pressure. The total cycle consists of four stages: (1) fill time—filling the mold, (2) dwell time—time steam heats the mold wall by conduction, (3) cook time—time steam actually passes through expanded pre-puff in the mold, and (4) cool time—time it takes for cooling water to cool the mold for cup ejection. The rim deflection of the cups in mils were determined on the Chatillion LTCM Tension and Compression Tester. Deflection speed was 0.35 inch/min. The deflection was measured when a maximum force of 200 grams was applied. The cups were aged at room temperature for 13 days prior to testing. The results are shown in Table I.

TABLE I

Prepuff Foam    Cup    Rim Deflection

| DVB, % | density, pcf. | Wt. (g) | mils | % Improvement |
|---|---|---|---|---|
| 0.0 | 3.70 | 2.23 | 372 | — |
|  | (3.98)$^a$ | (2.36)$^a$ | (322)$^a$ |  |
| 0.04 | 3.98 | 2.36 | 252 | 22 |

$^{(a)}$polystyrene value from polystyrene calibration curve obtained under similar molding conditions From the above data, it can be seen that 0.04% DVB has increased the stiffness of the molded cups over that of the straight polystyrene cups.

EXAMPLE II

Table II, Runs 1–6, illustrate the effect of varying the percent divinylbenzene while keeping the percent benzoyl peroxide at 0.25 and t-butyl perbenzoate at 0.066, all based on styrene. Runs 2–6 were repeats of Example I except for some changes in the suspension formulary for the bead preparations as indicated below with parts based on 100 parts of styrene.

| Formulary | Run 2 | 3$^{(a)}$ | 4 | 5 | 6 |
|---|---|---|---|---|---|
| H$_2$O (g) | 125 | 100 | 125 | 125 | 100 |
| TCP (g) | 2.0 | 1.5 | 2.5 | 3.0 | 2.0 |
| PPs (g) | 0.0015 | 0.0015 | 0.0015 | 0.0015 | — |

-continued

| Formulary | Run 2 | 3$^{(a)}$ | 4 | 5 | 6 |
|---|---|---|---|---|---|
| PVA (g) | — | — | — | — | 0.30 |

$^{(a)}$Actually Example 1
PPs = Potassium persulfate
PVA = Polyvinyl alcohol

The copolymer beads for Run 1 were made in a 2-liter resin kettle equipped with agitator, reflux condenser, combination baffle/thermometer well and using a nitrogen atmosphere. The charge consisted of 750 g distilled water, 7.5 g of one percent sodium dodecylbenzene sulfonate solution, 11.25 g of TCP and 750 g of styrene with 3.0 g benzoyl peroxide, 0.459 g of t-butyl perbenzoate and 0.30 g of active divinylbenzene. The mixture was heated from room temperature to 90° C. over about 30 minutes with agitation at 700 RPM. The temperature was maintained at 90° C. for 6 hours then cooled to room temperature. Then the bead slurry was transferred to 12 oz bottles and heated at 135° C. for 2 hours as in Example Ia.

The pre-screened, through 35 on 50 mesh, U.S. Standard Sieves, copolymer beads from Runs 1–6 were treated as in Example I, with batch expansion being either in the 5-gallon laboratory steam bucket or 5-gallon Buccaneer pre-expander.

TABLE II

| Run No. | DVB (%) | Toluene Gels (%) | $M_w \times 10^{-3}$ | $M_w/M_n$ | Prepuff, Density, pcf | Steam Pressure Header/Back psig | Cup Wt. (g) | Rim Deflection (mils) | % Improvement over Polystyrene Control Wt.(b) | Deflection(c) |
|---|---|---|---|---|---|---|---|---|---|---|
| 1 | 0 | 0 | 270 | 2.4 | 3.70 | 70/32 | 2.23 | 372 | — | — |
|  | 0.02 | <1.0 | 435 | 3.5 | 3.29 | 70/32 | 2.01 | 428 | — | — |
| 2 | 0.03 | 0.2 | 600 | 4.3 | 3.77 | 80/44 | 2.25 | 319 | 6 | 10 |
|  | 0.03 |  |  |  |  | 80/44(a) | 2.24(a) | 302(a) | 9(a) | 16(a) |
| 3 | 0.04 | 13 | 660 | 5.5 | 3.98 | 70/32 | 2.36 | 252 | 15 | 22 |
| 4 | 0.05 | 37 | 394 | 3.8 | 4.32 | 60/32 | 2.74 | 223 | 12 | 20 |
| 5 | a. 0.06 | 50 | 288 | 3.2 | 3.74 | 60/32 | 2.31 | 363 | 0 | 0 |
|  | b. 0.06 | 48 | 322 | 3.4 | 4.08 | 80/44 | 2.52 | 227 | 9 | 21 |
| 6 | 0.08 | 65 | 191 | 2.7 | 5.46 | 60/32 | Could not mold acceptable cups. | | | |

(a)Molded with 3-sec extra cook in the overall molding cycles; all others molded at minimum cycle to give acceptable cups.
(b)Percent reduction in a cup weight at the same deflection of polystyrene cups.
(c)Percent reduction in deflection at the same weight of polystyrene cups.

Here, rim deflections were calculated using calibration curves for polystyrene relating deflection to cup weight at given molding conditions.

It is clear that, at constant benzoyl peroxide level and increasing DVB concentration, molecular weight and polydispersity increase to a maximum. Then, as significant gels begin to form with increasing DVB, the molecular weight and polydispersity of the soluble component decrease dramatically. The much greater heat tolerance of these DVB copolymers is demonstrated in the cases of Runs 4 and 5a, in which the cook times were increased up to 30–50 seconds without causing burn. Polystyrene controls would show unacceptable burns at 2–3 seconds extra cook. The best overall balance of cup properties were at ~0.03–0.06% DVB.

EXAMPLE III

To illustrate the effect of varying the primary initiator (benzoyl peroxide) concentration for a given DVB concentration on the compositions of this application, several copolymer bead Runs (7–11) were made using stirred reactors, keeping the secondary initiator t-butyl perbenzoate essentially constant at 0.066–0.067% based on styrene.

Copolymer bead Runs 10 and 11 were made essentially as Run #1 except the benzoyl peroxide levels were increased to 0.32 and 0.40 parts based on styrene and active DVB percent increased to 0.04. Runs 7 and 8 were made in a stirred (85 rpm) 100 gallon reactor using a nitrogen atmosphere with the following charges based on 100 parts styrene:

| | RUN NUMBER | |
|---|---|---|
| | 7 | 8 |
| H$_2$O (distilled) | 100 | 150 |
| TCP | 0.80 | 1.0 |
| BPO | 0.20 | 0.225 |
| t-BP | 0.067 | 0.067 |
| DVB (active) | 0.04 | 0.04 |
| PPS | 0.0007 | 0.0006 |
| Sodium dodecyl-benzene sulfonate | 0.0031 | 0.0031 |

The reaction mixtures of runs 7 and 8 were heated to 90° C. over 1.25–2.5 hours, held at 90° C. for 6.0 hours, then heated to 135° C. and held at 135° C. for 3.0 hours, cooled to 35°–40° C., filtered and dried. Run 9 was essentially a 5000 gallon reactor scale-up of Run 8. The copolymer beads from Runs 7, 9a, 10 and 11 were impregnated, expanded and molded into cups as per Example I. Copolymer beads from Runs 8 and 9b were impregnated at 105° C. in a 25 gallon reactor and after acidification, filtering and drying, they were batch expanded in a 11 gallon Rodman pre-expander, and after aging molded into cups. The results are summarized in Table III.

In this series, gels increased with decreasing benzoyl peroxide levels with DVB kept at a contant 0.04%. Molecular weight and polydispersity increased to a maximum. Then, as gels began to increase, the molecular weight of the soluble component decreased.

TABLE III

| Run No. | Benzoyl Peroxide (%) | Toluene Gels (%) | $M_w \times 10^{-3}$ | $M_w/M_n$ | Prepuff, Density, pfc | Steam Pressure Header/Back psig | Cup Wt. (g) | Rim Deflection (mils) | % Improvement over Polystyrene Control Wt.(b) | Deflection(C) |
|---|---|---|---|---|---|---|---|---|---|---|
| 7 | 0.20 | 33 | 516 | 3.8 | 3.44 | 52/32 | 2.15 | 343 | 8.5 | 14 |
| 8 | 0.225 | 28 | 553 | 4.3 | 4.16 | 52/32(a) | 2.67 | 216 | 12 | 22 |
| 9a | | | | | 3.92 | 52/32(a) | 2.43 | 284 | 8 | 12 |
| 9 | 0.225 | 25 | 612 | 5.4 | | | | | | |
| b | | | | | 3.82 | 80/44 | 2.39 | 237 | 13 | 26 |
| 3 | 0.25 | 13 | 660 | 5.5 | 4.0 | 70/32 | 2.36 | 252 | 15 | 22 |
| 10 | 0.32 | <1.0 | 616 | 5.6 | 3.74 | 70/32 | 2.30 | 279 | 12 | 17 |
| 11 | 0.40 | <1.0 | 372 | 4.0 | 3.58 | 70/32 | 2.11 | 358 | 5 | 6.5 |

(a)Molded with 5.0 sec extra cook in the overall molding cycle; all others molded at minimum cycle to give acceptable cups.
(b)Percent reduction in cup weight at the same deflection of polystyrene cups.
(c)Percent reduction in deflection at the same weight of polystyrene cups.

We claim:
1. Expandable copolymer beads for use in producing foamed cups with improved strength and thermal properties comprising (a) copolymer beads made by copolymerizing a vinyl aromatic monomer and divinylbenzene said copolymer beads having a gel content of 0–50% by weight and a toluene soluble portion having a weight average molecular weight between 280,000 and 750,000 a polydisperisty of 3.0 to 7.0, and a bead size of through 30 mesh and on 80 mesh, U.S. Standard Sieve and (b) 3–12% of a blowing agent selected from the group consisting of aliphatic hydrocarbons containing 4–6 carbon atoms, halogenated hydrocarbons which boil at a temperature below the softening point of the polymer, and mixtures of these.

* * * * *